(12) United States Patent
Sangwan et al.

(10) Patent No.: US 6,758,739 B1
(45) Date of Patent: Jul. 6, 2004

(54) AIR QUALITY SYSTEM FOR A VEHICLE

(75) Inventors: Karma Vir Sangwan, East Amherst, NY (US); Thomas Martin Urbank, Lockport, NY (US); Susan Claire Vasko, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/378,784

(22) Filed: Mar. 4, 2003

(51) Int. Cl.[7] ................................................. B60H 3/06
(52) U.S. Cl. ........................... 454/75; 454/139; 454/158
(58) Field of Search .......................... 454/75, 139, 158, 454/162, 164, 165

(56) References Cited

U.S. PATENT DOCUMENTS

| | | | | | |
|---|---|---|---|---|---|
| 4,696,225 | A | * | 9/1987 | Weller | 454/158 |
| 5,085,132 | A | * | 2/1992 | Ikeda et al. | 454/158 |
| 5,167,129 | A | * | 12/1992 | Akasaka | 62/179 |
| 5,259,813 | A | | 11/1993 | Abthoff et al. | 454/75 |
| 6,086,474 | A | * | 7/2000 | Dohring | 454/143 |
| 6,209,331 | B1 | * | 4/2001 | Lake et al. | 62/180 |
| 2003/0077997 | A1 | * | 4/2003 | Shideler | 454/75 |

* cited by examiner

Primary Examiner—Harold Joyce
(74) Attorney, Agent, or Firm—Patrick M. Griffin (57) ABSTRACT

An air quality system for controlling air quality in a cabin of a vehicle is provided. The air quality system utilizes three air quality sensors for detecting three air quality parameters. A controller is responsive to the air quality sensors. The controller is programmed to determine a current value of the air quality parameters from the air quality sensors and to determine whether the current value of any of the air quality parameters exceeds a predetermined limit. The predetermined limits for the air quality parameters are based on levels indicative of poor air quality for the cabin. The controller is operable between purging and non-purging modes to purge the air from the cabin in the purging mode when the current value of any of the measured air quality parameters exceeds the respective predetermined limit.

61 Claims, 9 Drawing Sheets

AIR QUALITY SYSTEM FOR A VEHICLE

FIELD OF THE INVENTION

The present invention relates to an air quality system for use in a vehicle. In particular, the present invention relates to the air quality system being used to control the air quality within a cabin of the vehicle.

BACKGROUND OF THE INVENTION

Conventional air quality systems for vehicles are typically utilized to control air quality within a cabin of the vehicle by controlling a source of the air flowing into the cabin. Such a system typically comprises an outside air quality sensor for detecting an air quality parameter such as carbon monoxide, nitrous oxides, and the like. A controller is responsive to the outside air quality sensor to determine a current value of the air quality parameter that is detected.

The controller then makes a determination as to whether the air quality within the cabin is better or worse than the air quality outside of the cabin. Once the determination is made, the controller controls airflow into the cabin by controlling the source of the air. For instance, if the air quality within the cabin is better that the air quality outside of the cabin, then the air source will be the cabin, i.e. recirculated air. If the air quality outside of the cabin is better than the air quality inside the cabin; then the air source will be fresh air from the outside of the cabin.

In typical prior art systems, an air inlet valve is responsive to the controller and movable between recirculate air and fresh air positions such that fresh air from outside of the cabin moves through the air inlet valve into the cabin in the fresh air position and air from within the cabin is recirculated in the cabin in the recirculate position. Hence, once the determination of whether the air quality within the cabin is better or worse than the air quality outside of the cabin, the controller actuates the air inlet valve to move to either the recirculate air or fresh air positions.

One example of a prior art air quality system is shown in U.S. Pat. No. 5,259,813 to Abthoff et al., granted on Nov. 9, 1993. The air quality system of Abthoff et al. is utilized to control the air quality within a cabin of a vehicle. The system comprises an outside air quality sensor for detecting an air quality parameter outside of the cabin of the vehicle. A controller is responsive to the outside air quality sensor to determine a current value of the air quality parameter that is detected. The controller then calculates the air quality within the cabin based on pollutant concentrations in the air outside of the cabin. Such a calculation takes into account time-varying concentrations of the pollutant in the air outside of the cabin and the pollutants measured. It should be noted that an air quality sensor is not used to determine the air quality within the cabin.

Still referring to Abthoff et al., once the air quality within the cabin is calculated, i.e., a concentration of the air quality parameter within the cabin is established, the controller makes a determination as to whether the air quality within the cabin is better or worse than the air quality outside of the cabin. The controller then controls airflow in the cabin by controlling the source of the air. For instance, if the air quality within the cabin is better that the air quality outside of the cabin, then the air source will be the cabin, i.e. recirculated air. If the air quality outside of the cabin is better than the air quality inside the cabin, then the air source will be fresh air from the outside of the cabin.

In Abthoff et al., an air inlet valve that is responsive to the controller is employed to move between recirculate air and fresh air positions such that fresh air from outside of the cabin moves through the air inlet valve into the cabin in the fresh air position and air from within the cabin is recirculated in the cabin in the recirculate position. Hence, once the determination of whether the air quality within the cabin is better or worse than the air quality outside of the cabin, the controller actuates the air inlet valve to move to either the recirculate air or fresh air positions.

Abthoff et al. further teaches the use of ventilation openings in a rear of the vehicle to create airflow through the cabin while the vehicle is moving. This airflow is to remove the air within the cabin. The ventilation openings are stand-alone features that are not integrated into the air quality system of Abthoff et al. Such conventional ventilation openings allow for slow rates of airflow through the cabin. Hence, when the air inlet valve is in the fresh air position to draw in fresh air from outside of the cabin, the rate for replacing the air within the cabin of the vehicle with the fresh air is slow. Therefore, there is a need in the art to provide a faster airflow rate through the cabin to quickly purge the air from the cabin and replace the air with fresh air from outside of the cabin.

SUMMARY OF THE INVENTION AND ADVANTAGES

The present invention provides an air quality system for controlling air quality within a cabin of a vehicle. The air quality system comprises an air quality sensor to detect an air quality parameter. A controller is responsive to the air quality sensor to determine a current value of the air quality parameter and determine whether the current value exceeds a predetermined limit. The predetermined limit represents poor air quality within the cabin. The controller is operable between purging and non-purging modes to purge the air from the cabin in the purging mode when the current value of the measured parameter exceeds the predetermined limit. An air inlet valve is responsive to the controller and movable between recirculate air and fresh air positions such that fresh air from outside of the cabin moves through the air inlet valve into the cabin in the fresh air position. The air,inlet valve moves to the fresh air position when the controller is in the purging mode to improve the air quality within the cabin of the vehicle. A cabin relief valve is responsive to the controller and movable between purge and recirculate positions such that the air within the cabin is discharged from the cabin to the outside of the cabin in the purge position. The cabin relief valve moves to the purge position when the controller is in the purging mode to improve the air quality within the cabin of the vehicle.

A method of controlling the air quality within the cabin of the vehicle is also provided. To start the method requires establishing the predetermined limit for the air quality parameter. A current value of the air quality parameter is then determined and compared to the predetermined limit for the air quality parameter. When the determined current value of the air quality parameter exceeds the predetermined limit for the air quality parameter, the air within the cabin of the vehicle is replaced with fresh air from outside the cabin of the vehicle thereby improving the air quality within the cabin of the vehicle.

The present invention provides several advantages over the prior art. The connectivity between the controller and the cabin relief valve allows the air quality system to quickly and efficiently replace the air in the cabin of the vehicle with fresh air from outside of the cabin of the vehicle. The ability of the controller to both move the air inlet valve to the fresh air position and the cabin relief valve to the purge position provides rapid replacement of the air within the cabin when the air within the cabin is of poor air quality.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, an air quality system for controlling air quality within a cabin 10 of a vehicle 12 is generally shown at 14.

Figure 1:
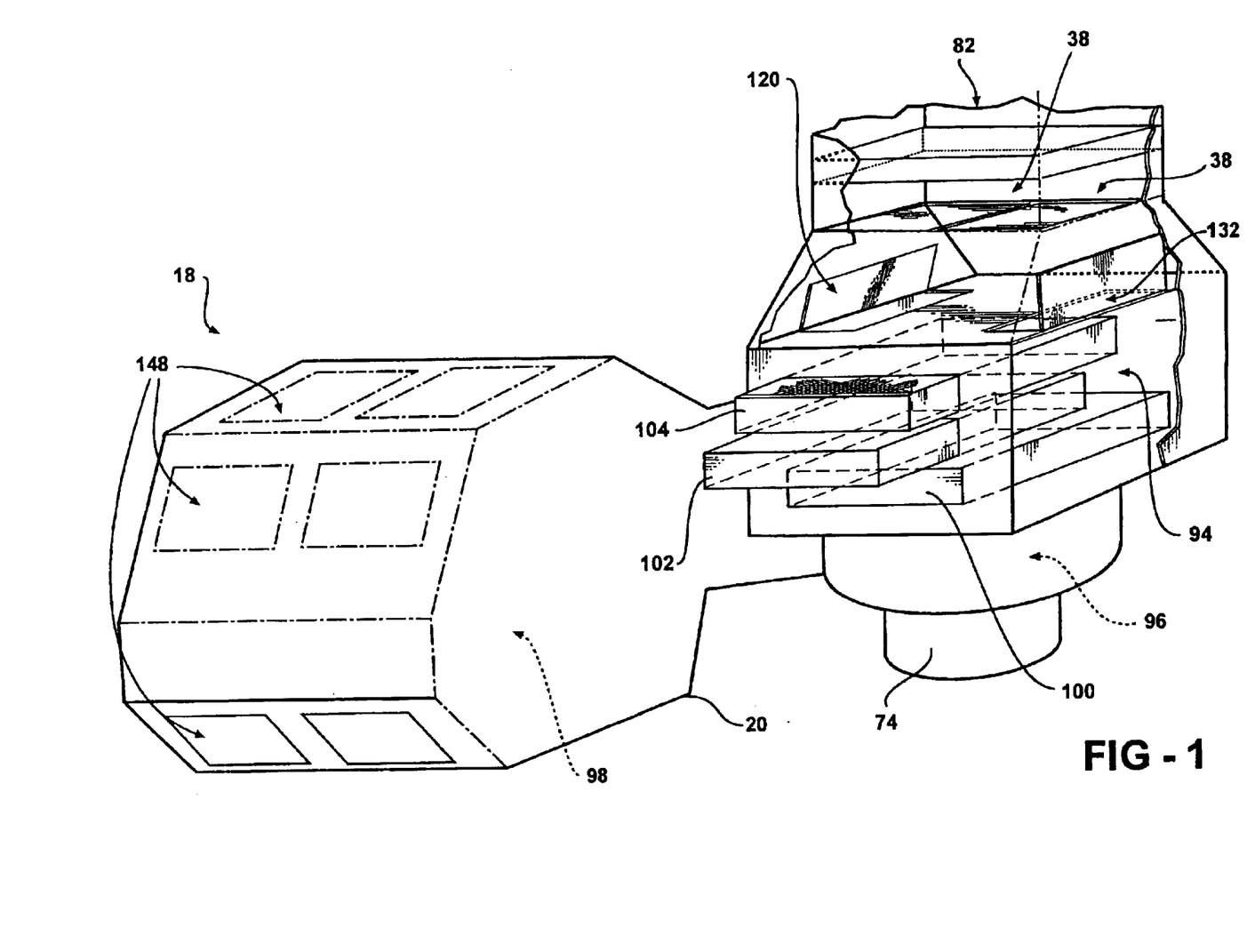
FIG. 1 is a perspective view of an HVAC unit of the present invention.
Figure 2:
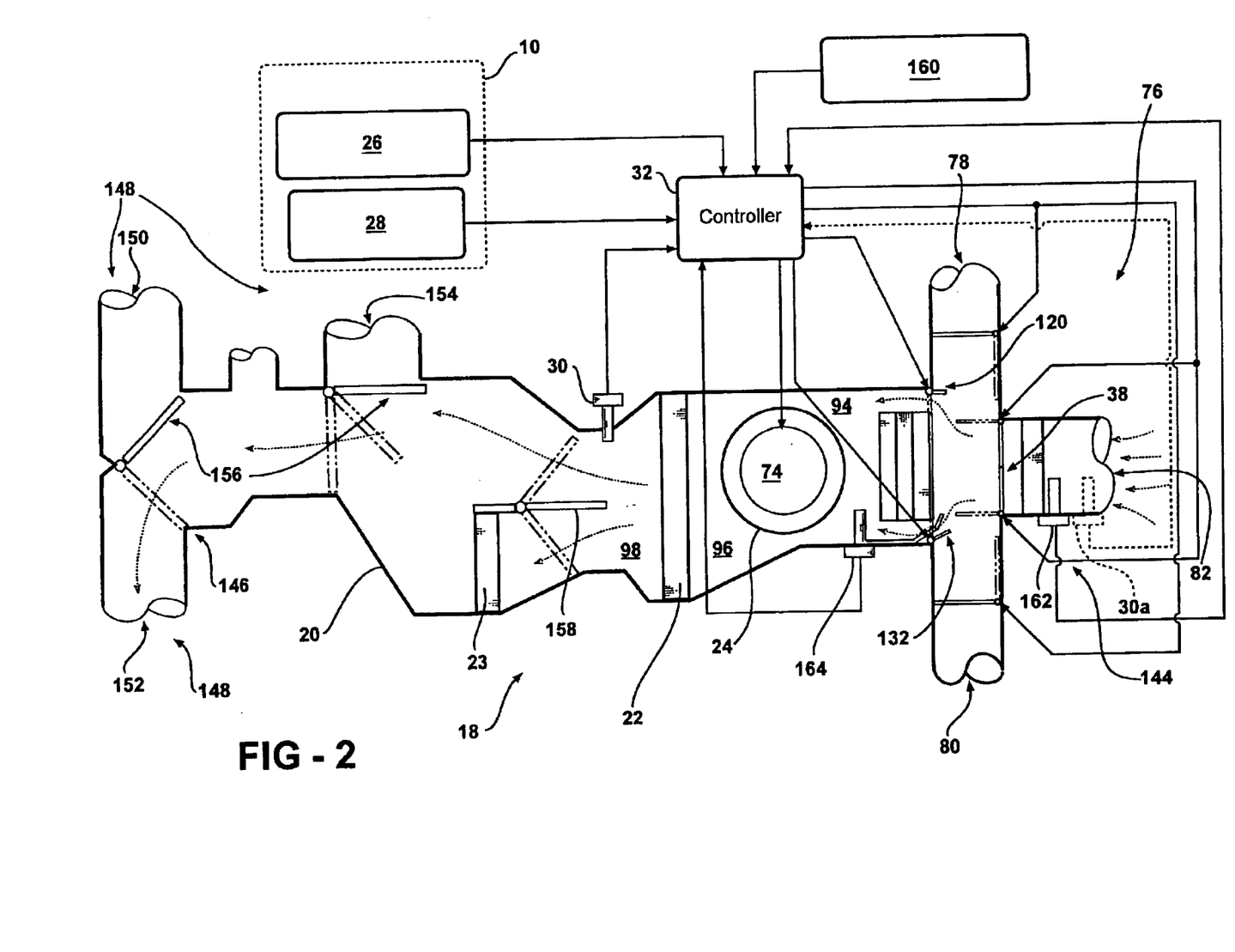
FIG. 2 is a schematic view of the HVAC unit illustrating integration of the HVAC unit in an air quality system of the present invention.
Figure 3A:
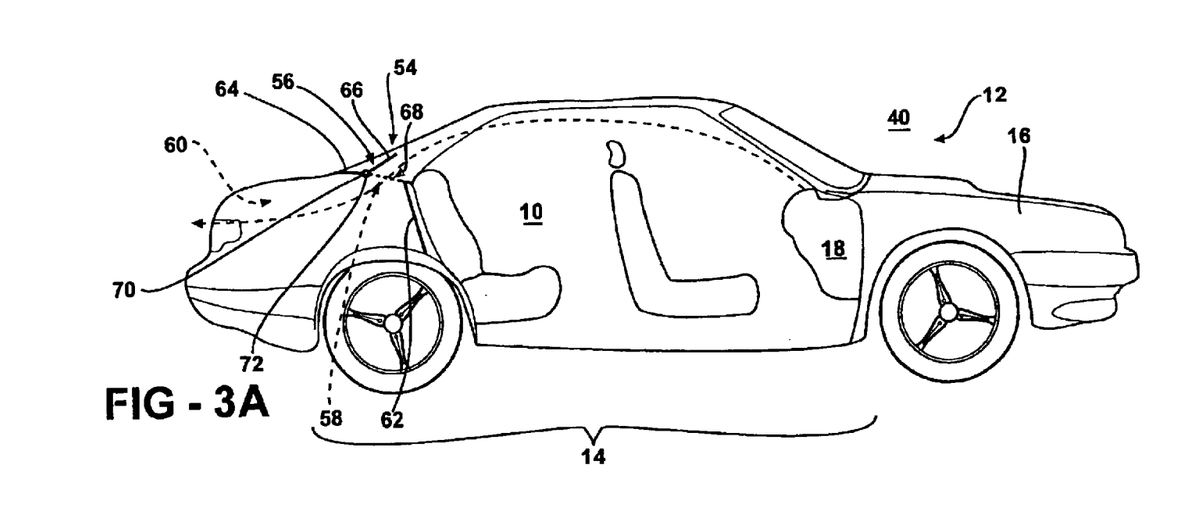
FIG. 3A is an elevational view of a vehicle having the air quality system of the present invention illustrating airflow within a cabin of the vehicle.
Figure 3B:
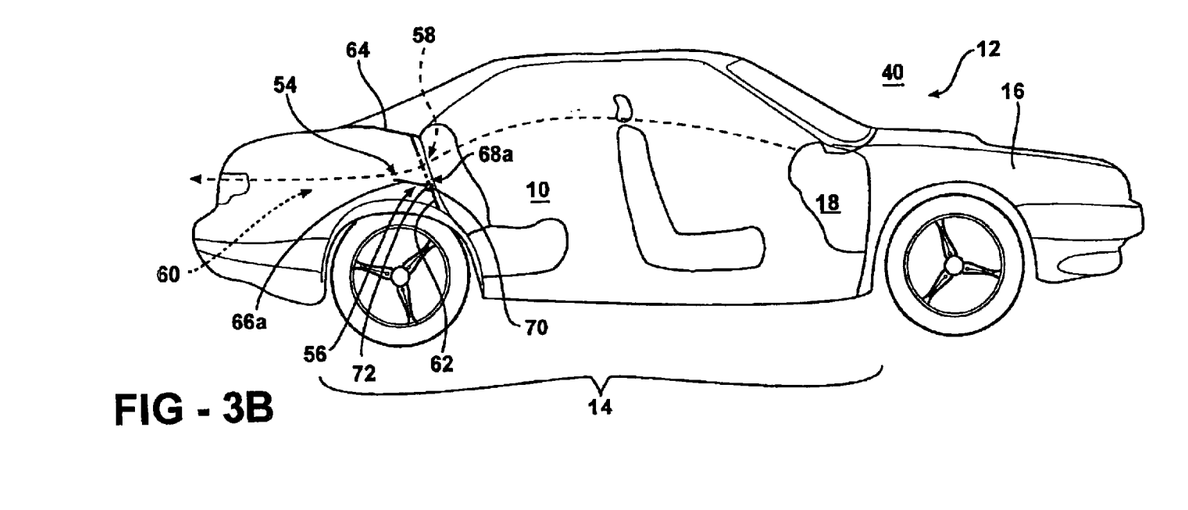
FIG. 3B is an elevational view of a vehicle illustrating an alternative embodiment of the air quality system of the present invention.

Referring first to FIGS. 3A and 3B, the vehicle 12 includes a vehicle body 16 further defining the cabin 10. The air quality system 14 is disposed within the vehicle body 16 of the vehicle 12. The vehicle 12 also includes an HVAC unit 18 for heating and/or cooling air within the cabin 10 of the vehicle 12 as is well known to those skilled in the art. The air quality system 14 of the present invention is partially integrated with the HVAC unit 18 for ease of manufacturing and implementation. Referring to FIG. 2, the HVAC unit 18 comprises a housing 20 enclosing an evaporator 22, a heater core 23, and a blower 24 as is conventional in the art to heat and cool the air for the cabin 10 of the vehicle 12. The evaporator 22 is downstream of the blower 24 and the heater core 23 is downstream of the evaporator 22. The HVAC unit 18 is positioned within the vehicle body 16 near a front of the vehicle 12, as shown in FIGS. 3A and 3B.

Still referring to FIG. 2, the air quality system 14 utilizes three air quality sensors 26,28,30 for detecting three air quality parameters. The first air quality sensor 26 is a cabin air temperature sensor 26 for detecting air temperature inside the cabin 10. The second air quality sensor 28 is a particulate sensor 28 for detecting particulates inside the cabin 10. The particulate sensor 28 may be an infrared sensor as is well known in the art for detecting particulates. The third air quality sensor 30 is a carbon dioxide or refrigerant gas sensor 30 for detecting carbon dioxide or refrigerant gas for the cabin 10. It should be appreciated that separate carbon dioxide and refrigerant gas sensors could be employed. However, for purposes of description, these sensors will be described together. The cabin air temperature sensor 26 and the particulate sensor 28 are disposed proximate the cabin 10 of the vehicle 12 to directly measure the inside air temperature and the particulates within the cabin 10. The carbon dioxide or refrigerant gas sensor 30 is disposed within the housing 20 of the HVAC unit 18 near the evaporator 22.

The cabin air temperature sensor 26 is utilized to control heat soak within the cabin 10 that occurs when the vehicle 12 has been exposed to high temperatures. This condition is typical when the vehicle 12 has been exposed to the sun for extended periods of time during hot summer months. The particulate sensor 28 is particularly useful to control smoke levels in the cabin 10 such as those associated with cigarette or cigar smoking by passengers in the vehicle 12. The carbon dioxide or refrigerant gas sensor 30 is used to control carbon dioxide or refrigerant gas levels within the cabin 10 of the vehicle 12 by first detecting the levels in the housing 20 of the HVAC unit 18. This ensures that dangerous carbon dioxide or refrigerant gas levels can be avoided in the cabin 10 of the vehicle 12 by detecting the carbon dioxide or refrigerant gas before the air in the housing 20 reaches the cabin 10.

A controller 32 is proximate to the vehicle body 16 and responsive to the air quality sensors 26,28,30. The controller 32 utilizes input signals and output signals as is well known in the art to control the air quality system 14. The controller 32 is programmed to determine a current value of the air quality parameters from the air quality sensors 26,28,30 and to determine whether the current value of any of the air quality parameters exceeds a predetermined limit. The predetermined limits for the air quality parameters are based on levels indicative of poor air quality for the cabin 10. For instance, the predetermined limit for cabin air temperature may be ten degrees Fahrenheit above an outside air temperature or ten degrees Fahrenheit above a temperature set by a passenger of the vehicle 12. The predetermined limit for particulates in the cabin 10 may be 10 mg/m3, and the predetermined limit for carbon dioxide or refrigerant gas for the cabin 10 may be 5,000–10,000 ppm. It should be appreciated that these predetermined limits are merely examples and the present invention should not be limited as such. The controller 32 is operable between purging and non-purging modes to purge the air from the cabin 10 in the purging mode when the current value of any of the measured air quality parameters exceeds the respective predetermined limit.

Figure 2A:
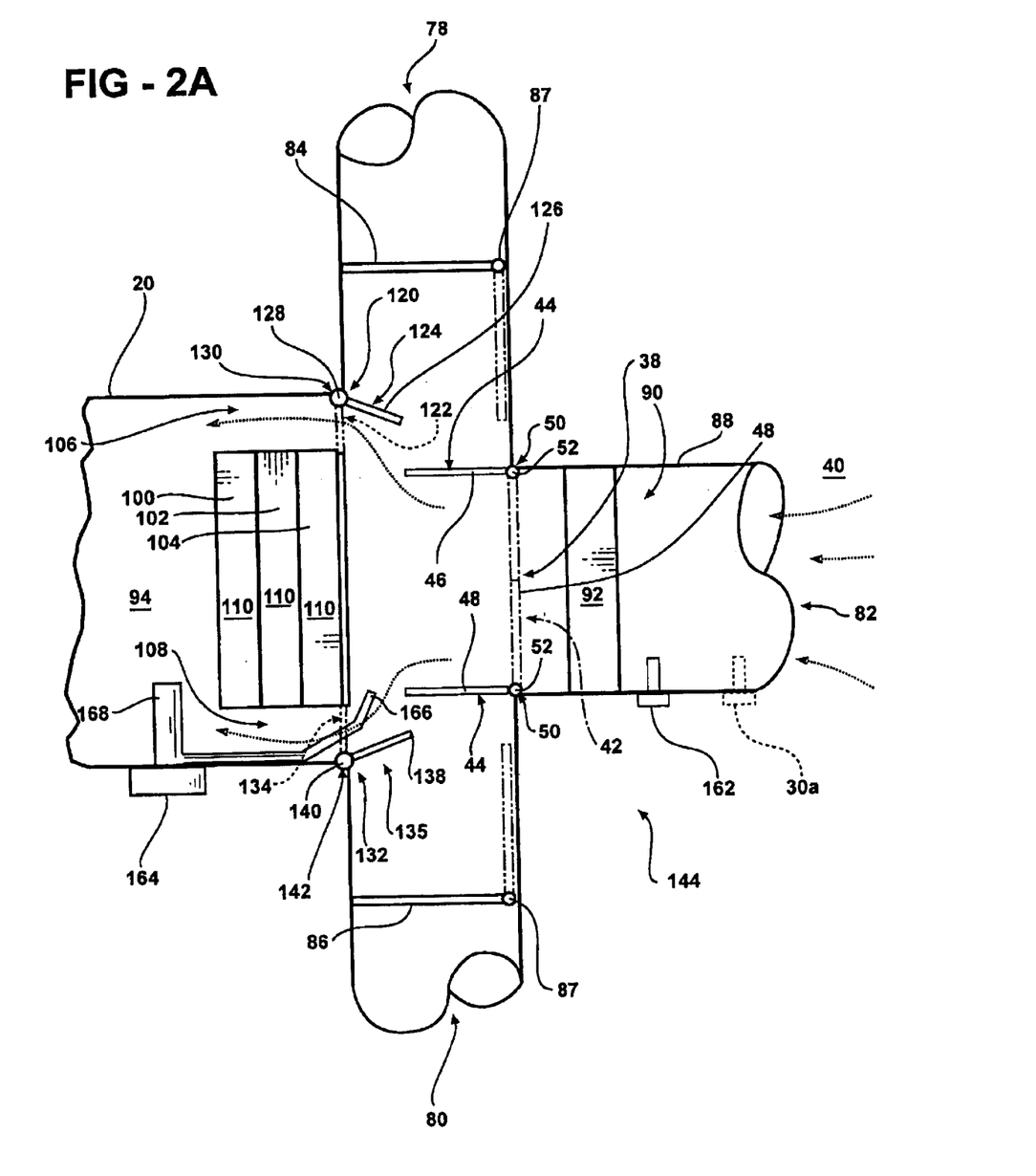
FIG. 2A is a blow-up view of a portion of FIG. 2.

Referring to FIG. 2A, an air inlet valve 38 engages the housing 20 and is responsive to the controller 32. The air inlet valve 38 controls airflow into the housing 20 from outside 40 of the cabin 10. The air inlet valve 38 is movable between recirculate air 42 and fresh air 44 positions. In the fresh air position 44, fresh air from the outside 40 of the cabin 10 moves through the air inlet valve 38 and into the cabin 10. In the recirculate air position 42, air is recirculated into the housing 20 from the cabin 10, i.e., the air inlet valve 38 is closed to the outside 40. The air inlet valve 38 moves to the fresh air position 44 when the controller 32 is in the purging mode to improve the air quality within the cabin 10 of the vehicle 12. The air inlet valve 38 is shown in the fresh air position 44 in FIG. 2A. The air inlet valve 38 may comprise a pair of mode doors 46,48, as shown in FIG. 2A, or the air inlet valve 38 may comprise a tri-mode door or butterfly type valve. The particular configuration of the air inlet valve 38 is not intended to limit the present invention.

Still referring to FIG. 2A, an air inlet valve actuator 50 is responsive to the controller 32 and operatively engages the housing 20 to move the air inlet valve 38 between the recirculate air 42 and the fresh air 44 positions. The air inlet valve actuator 50 may be a pair of motors 50 or solenoids 50 electrically coupled to the controller 32 and capable of pivoting the pair of mode doors 46,48 about pivot axes 52 in order to move the mode doors between the recirculate air 42 and fresh air 44 positions.

Referring to FIGS. 3A and 3B, a cabin relief valve 54 is also proximate the vehicle body 16 and responsive to the controller 32. The cabin relief valve 54 is movable between purge 56 and recirculate 58 positions. In the purge position 56, the air within the cabin 10 is discharged from the cabin 10 to the outside 40 of the vehicle body 16. In the recirculate position 58, the air in the cabin 10 cannot escape to the outside 40 through the cabin relief valve 54. The cabin relief valve 54 moves to the purge position 56 when the controller 32 is in the purging mode to improve the air quality within the cabin 10 of the vehicle 12. The cabin relief valve 54 may assume a number of configurations to provide an outlet for the air from the cabin 10 to escape to the outside 40.

The vehicle body 16 defines a trunk space 60 partitioned from the cabin 10 by a partition wall 62 and a rear ledge 64 in a rear of the vehicle body 16. The partition wall 62 engages the rear ledge 64 and extends downwardly from the rear ledge 64. Both the rear ledge 64 and the partition wall 62 separate the trunk space 60 from the cabin 10.

In one embodiment, referring to FIG. 3A, the cabin relief valve 54 comprises a relief door 66 positioned in the rear ledge 64 to selectively cover and uncover an exit duct 68 in the rear ledge 64. The relief door 66 covers the exit duct 68 in the recirculate position 58 and uncovers the exit duct 68 in the purge position 56. When the cabin relief valve 54 is in the purge position 56, the air from within the cabin 10 exits through the exit duct 68 into the trunk space 60.

In another embodiment, referring to FIG. 3B, a relief door 66a is positioned in the partition wall 62 to selectively cover and uncover an exit duct 68a in the partition wall 62. As described in the previous embodiment, the relief door 66a covers the exit duct 68a in the recirculate position 58 and uncovers the exit duct 68a in the purge position 56. When the cabin relief valve 54 is in the purge position 56, the air from within the cabin 10 exits through the exit duct 68a in the partition wall 62 into the trunk space 60.

A cabin relief valve actuator 70 is responsive to the controller 32 and operatively engages the cabin relief valve 54 to move the cabin relief valve 54 between the purge 56 and recirculate 58 positions. The cabin relief valve actuator 70 may be a motor or solenoid electrically coupled to the controller 32 and capable of pivoting the relief door 66,66a about a pivot axis 72 in order to move the relief door 66,66a between the purge 56 and recirculate 58 positions.

Hence, when the current value of any one of the three air quality parameters exceeds the respective predetermined limit, the controller 32 operates in the purging mode. In the purging mode, the controller 32 moves the air inlet valve 38 to the fresh air position 44 to draw in fresh air from the outside 40 of the vehicle 12, while simultaneously moving the cabin relief valve 54 to the purge position 56. With these simultaneous actions, the air quality system 14 can quickly replace the air from the cabin 10 with the fresh air from the outside 40 of the cabin 10.

Referring back to FIGS. 2 and 2A, the blower 24 of the HVAC unit 18 is operatively responsive to the controller 32 for moving air through the air inlet valve 38. The blower 24 includes a blower motor 74 that is electrically coupled to the controller 32 for operation between low and high speeds. The controller 32 automatically actuates the blower motor 74 at the high speed when the controller 32 is in the purging mode to quickly purge the air from the cabin 10.

The housing 20 of the HVAC unit 18 defines a plurality of inlet ducts 76 to direct air into the housing 20. The plurality of inlet ducts 76 include first 78 and second 80 recirculation ducts and an outside air duct 82. The air inlet valve 38 opens the outside air duct 82 by moving to the fresh air position 44 when the controller 32 is in the purging mode thereby allowing the fresh air from outside 40 of the cabin 10 to move through the outside air duct 82 into the housing 20. The air inlet valve 38 closes the outside air duct 82 by moving to the recirculate 58 position. Referring specifically to FIG. 2A, two recirculation valves 84,86 in the form of mode doors 84,86, actuatable by motors 87 or solenoids 87, are used to open and close the first 78 and second 80 recirculation ducts, respectively. Preferably, when the air inlet valve 38 is in the fresh air position 44, the first 78 and second 80 recirculation ducts are closed to prevent the air in the cabin 10 from being recirculated into the housing 20 of the HVAC unit 18.

The housing 20 includes an outside air duct housing 88 to further define the outside air duct 82. An outside air particulate filter 90 is positioned in the outside air duct 82 to remove particulates from the air entering the cabin 10 from the outside 40. The outside air duct housing 88 is a rectangular extension of the housing 20 such that the outside air particulate filter 90, which is also rectangular, is snugly seated within the outside air duct housing 88. The outside air particulate filter 90 is sealed within the outside air duct housing 88 to force the fresh air from the outside 40 of the cabin 10 through the outside air particulate filter 90 before passing through the outside air duct 82. The outside air particulate filter 90 may comprise a cartridge 92 and a filter element (not shown) disposed therein that slides into engagement with the outside air duct housing 88.

Referring specifically to FIG. 2, the housing 20 is divided into three compartments 94,96,98. The three compartments 94,96,98 include a filter compartment 94, a blower compartment 96, and a heat exchange compartment 98. The blower 24 is positioned in the blower compartment 96. The heater core 23 and evaporator 22 are disposed in the heat exchange compartment 98. Referring to FIG. 2A, a plurality of air filters 100,102,104 are disposed in the filter compartment 94 of the housing 20. The plurality of air filters 100,102,104 and the housing 20 define a pair of air passageways 106,108 therebetween. The air passageways 106, 108 are capable of providing operative communication between the outside air duct 82 and the blower compartment 96. Each of the plurality of filters 100,102,104 comprises a tray 110 enclosing a filter element (not shown). The trays 110 slidably engage the housing 20 such that the trays 110 slide into the filter compartment 94 when in an operating position. The trays 110 lock into place when in the operating position by way of a conventional locking system (not shown) such as a snap-fit or releasable detent. One of the plurality of air filters 100,102,104 is a carbon monoxide filter 100 to remove carbon monoxide from the air. Another of the plurality of air filters 100,102,104 is an activated carbon filter 102 to remove odors from the air.

Yet another of the plurality of air filters 100,102,104 is a particulate filter 104 that is electrically enhanced to remove the particulates from the air.

A first filter bypass valve 120 engages the housing 20. The first filter bypass valve 120 moves between filter 122 and bypass 124 positions to selectively move air through the plurality of air filters 100,102,104 in the filter position 122 and through a first 106 of the pair of air passageways 106,108 in the bypass position 124 thereby bypassing the plurality of filters 100,102,104 in the bypass position 124. Hence, the first filter bypass valve 120 opens and closes the first 106 of the pair of air passageways 106,108. The first filter bypass valve 120 may comprise a first bypass mode door 126 pivotable about a first axis 128. A first filter bypass valve actuator 130 is responsive to the controller 32 and operatively engages the first filter bypass valve 120 to move the first filter bypass valve 120 between the filter 122 and bypass 124 positions. The first filter bypass valve actuator 130 may be a motor or solenoid electrically coupled to the controller 32 and capable of pivoting the first bypass mode door 126 about the first axis 128 in order to move the first bypass mode door 126 between the filter 122 and bypass 124 positions.

A second filter bypass valve 132 engages the housing 20. The second filter bypass valve 132 moves between filter 134 and bypass 136 positions to selectively move air through the plurality of air filters 100,102,104 in the filter position 134 and through a second 108 of the pair of air passageways 106,108 in the bypass position 136 thereby bypassing the plurality of filters 100,102,104 in the bypass position 136. Hence, the second filter bypass valve 132 opens and closes the second 108 of the pair of air passageways 106,108. The second filter bypass valve 132 may comprise a second bypass mode door 138 pivotable about a second axis 140. A second filter bypass valve actuator 142 is responsive to the controller 32 and operatively engages the second filter bypass valve 132 to move the second filter bypass valve 132 between the filter 134 and bypass 136 positions. The second filter bypass valve actuator 142 may be a motor or solenoid electrically coupled to the controller 32 and capable of pivoting the second bypass mode door 138 about the second axis 140 in order to move the second bypass mode door 138 between the filter 134 and bypass 136 positions.

Referring to FIG. 2, the housing 20 includes an upstream 144 and a downstream 146 end such that air moves from the upstream 144 to the downstream 146 end, as illustrated by the arrows in FIG. 2. The first and second filter bypass valves 120,132 are downstream of the air inlet valve 38 and upstream of the blower 24 in the housing 20. Hence, the fresh air from the outside 40 is drawn in through the outside air duct 82 then moves through the air inlet valve 38 and through the air passageways 106,108 before reaching the blower 24 in the housing 20. As previously mentioned, the carbon dioxide or refrigerant gas sensor 30 is disposed within the housing 20 of the HVAC unit 18 near the evaporator 22. Preferably, the carbon dioxide or refrigerant gas sensor 30 is positioned downstream of the evaporator 22 such that the carbon dioxide or refrigerant gas sensor 30 measures carbon dioxide or refrigerant gas emanating from the evaporator 22.

The housing 20 defines a plurality of outlet ducts 148 for directing the air from within the housing 20 of the HVAC unit 18 into the cabin 10 of the vehicle 12. The plurality of outlet ducts 148 include at least a defrost duct 150, a heater duct 152, and a vent duct 154. A plurality of mode doors 156 is utilized within the housing 20 to direct the air within the housing 20 through the outlet ducts 148 and into the cabin 10, as is well known in the art. An air mixing door 158 is also utilized, as is well known in the art, to divert airflow in the housing 20 toward and away from the heater core 23 after the air has passed through the evaporator 22.

An outside air temperature sensor 160 measures an outside air temperature of the air outside of the cabin 10. The controller 32 is responsive to the outside air temperature sensor 160 to determine whether the vehicle 12 may be in the heat soak condition as previously described. However, if the outside air temperature is below a predetermined value, such as seventy-five degrees Fahrenheit, then the controller 32 will not operate in the purging mode based solely on the cabin air temperature rising above the predetermined limit (one of the other air quality parameters can still trigger the purging mode). Hence, even if the cabin air temperature sensor 26 indicates that the cabin air temperature is ten degrees or more above the outside air temperature, the controller 32 will not switch to the purging mode when the outside air temperature is below the predetermined value. This is to compensate for cooler weather conditions, when invariably the cabin 10 will be much warmer than the outside air temperature. In alternative embodiments, the controller 32 may still operate in the purging mode when the cabin air temperature is greater than ten degrees above the temperature set by the passenger, regardless of whether the outside air temperature is less than or equal to seventy-five degrees.

An outside air quality sensor 162 measures carbon monoxide, nitrogen oxides, sulfer dioxide, hydrogen sulfide, and un-burnt hydrocarbons in the air outside of the cabin 10. The controller 32 is responsive to the outside air quality sensor 162. For instance, the controller 32 may determine that the outside air is more harmful than the air within the cabin 10 of the vehicle 12 even though one of the air quality parameters has exceeded the respective predetermined limits. Hence, the controller 32 may preclude operation in the purging mode to protect the passengers in the vehicle 12.

Referring to FIG. 2A, a pressure sensor 164 is proximate the housing 20 to measure a pressure differential across the plurality of air filters 100,102,104. The pressure sensor 164 includes a first transducer 166 near the inlet ducts 78,80,82 and a second transducer 168 near the blower compartment 96 in order to measure the pressure drop as air from the inlet ducts 78,80,82 moves through the filters 100,102,104 to the blower compartment 96. The controller 32 is responsive to the pressure sensor 164 to control movement of the first and second filter bypass valves 120,132 in response to the pressure drop across the plurality of air filters 100,102,104 exceeding a predetermined pressure drop. For instance, provided the outside air is clean, the filter bypass valves 120,132 may be moved from the filter positions 122,134 to the bypass positions 124,136 when the pressure drop exceeds the predetermined pressure drop to increase efficiency of the air quality system 14. Preferably, the filter bypass valves 120,132 are automatically moved into the bypass positions 124,136 when the controller 32 is in the purging mode. However, in alternative embodiments, the controller 32 may be programmed to only move the filter bypass valves 120,132 to the bypass positions 124,136 when the pressure drop exceeds the predetermined pressure drop.

In alternative embodiments, a second carbon dioxide or refrigerant gas sensor 30a may be used to determine an incoming carbon dioxide or refrigerant gas concentration from the outside 40 of the cabin 10 or from the recirculation ducts 78,80. The second carbon dioxide or refrigerant gas sensor may be used to determine a change in the concentration of carbon dioxide or refrigerant gas from the inlet ducts 76 to the heat exchange compartment 98. This may provide an indication of the contribution of carbon dioxide or refrigerant gas from the evaporator 22. The second carbon dioxide or refrigerant gas sensor 30a is operatively connected to the controller 32. The predetermined limit for carbon dioxide or refrigerant gas for the cabin 10 may be based on the difference between the current values of carbon dioxide or refrigerant gas detected by the carbon dioxide or refrigerant gas sensors 30,30a such that the controller 32 switches to the purging mode when the difference is above the predetermined limit.

Figure 4:
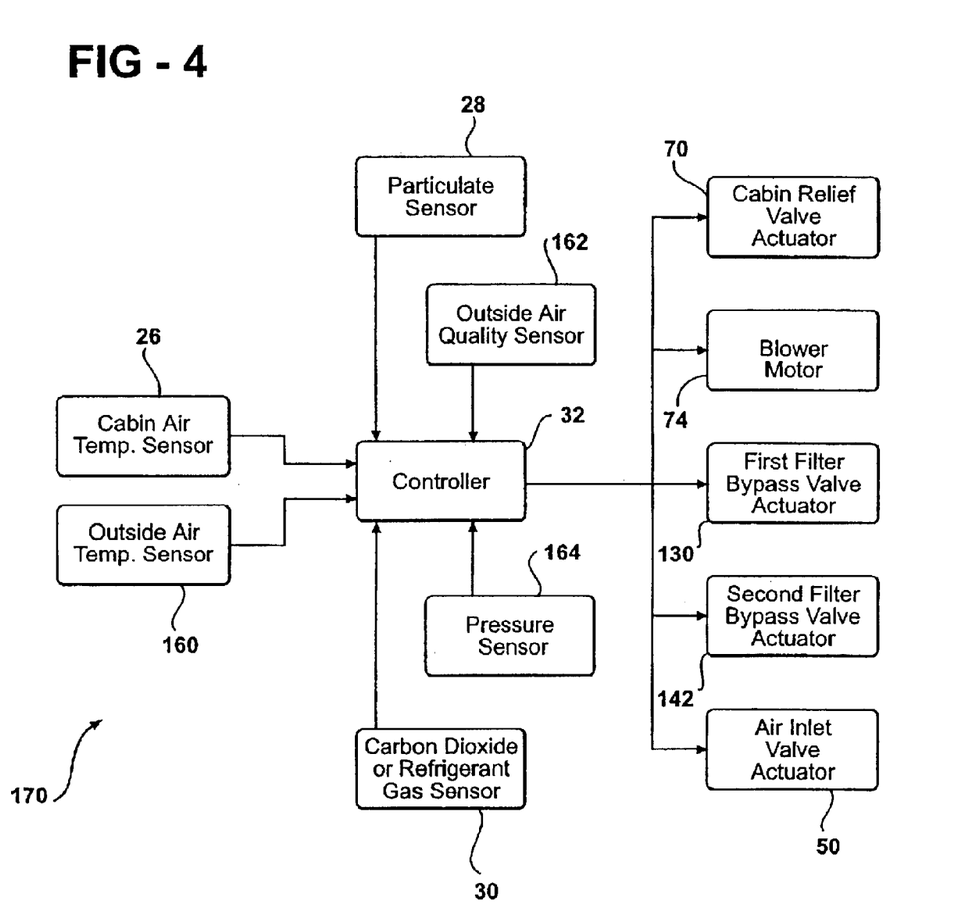
FIG. 4 is a block diagram illustrating a control system of the air quality system of the present invention.

Referring to FIG. 4, connectivity of the components of the air quality system 14 as previously described is illustrated. The components that are shown in FIG. 4 are electronically coupled together to make up a control system 170 for the air quality system 14. The control system 170 comprises the controller 32 that processes input signals from the cabin air temperature sensor 26, outside air temperature sensor 160, particulate sensor 28, carbon dioxide or refrigerant gas sensor 30, outside air quality sensor 162, and pressure sensor 164. The controller 32 processes these signals as described herein. The controller 32 utilizes these input signals to control the cabin relief valve actuator 70, blower 24, first filter bypass valve actuator 130, second filter bypass valve actuator 142, and the air inlet valve actuator 50 as described herein.

Operation

Figure 5:
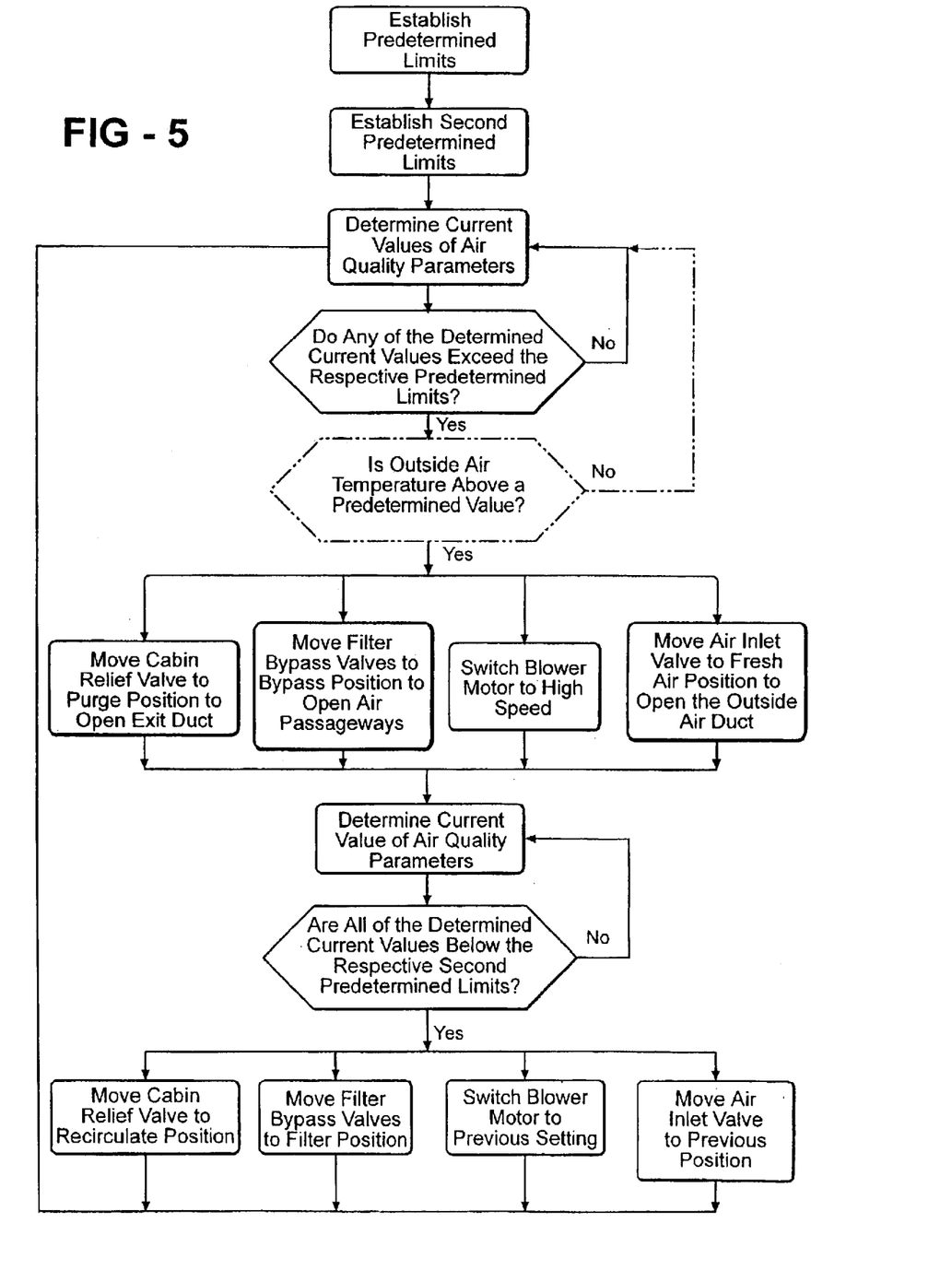
FIG. 5 is a flowchart illustrating steps carried out by the air quality system of the present invention.
Figure 6:
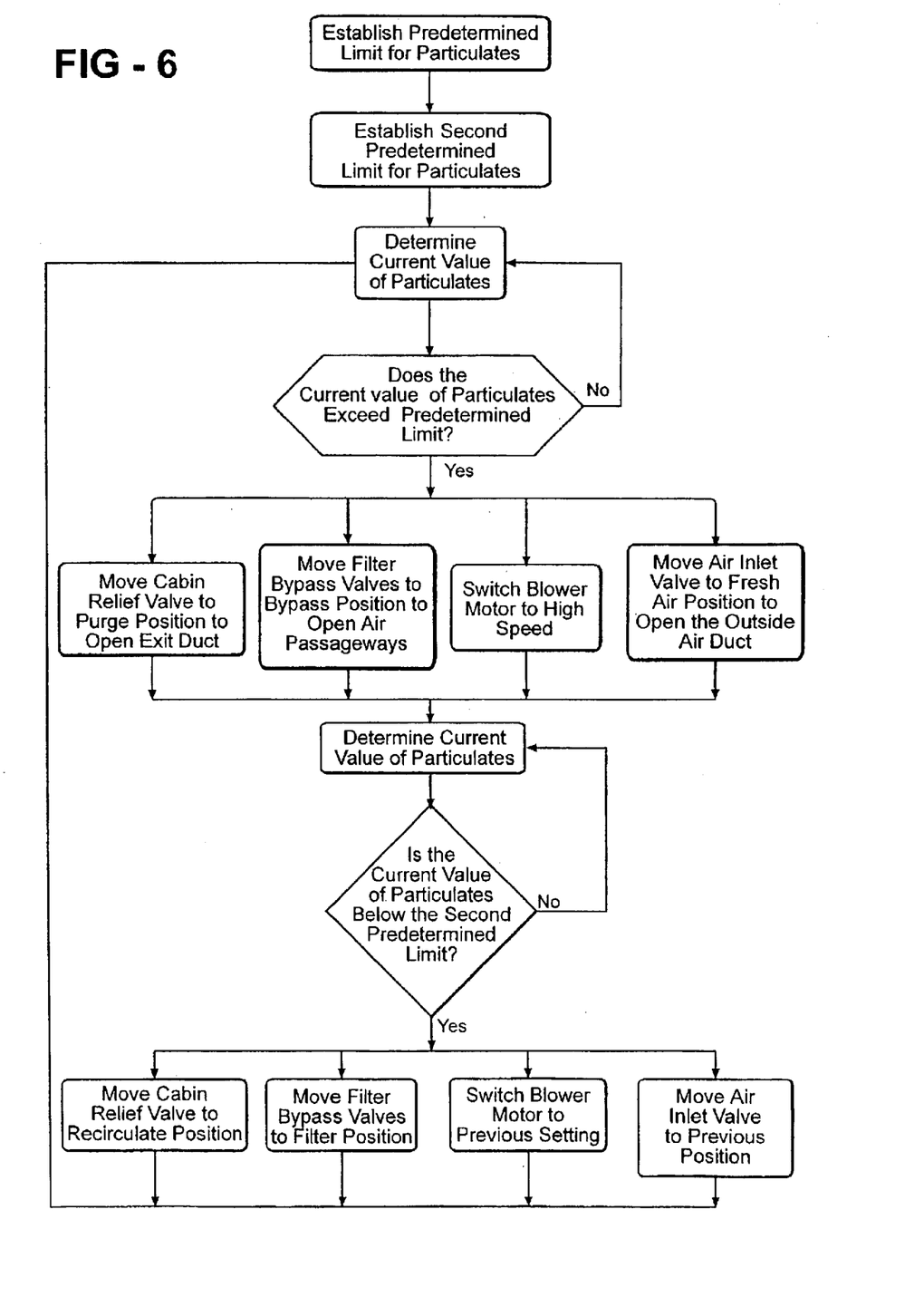
FIG. 6 is a flowchart illustrating steps carried out by the air quality system of the present invention.
Figure 7:
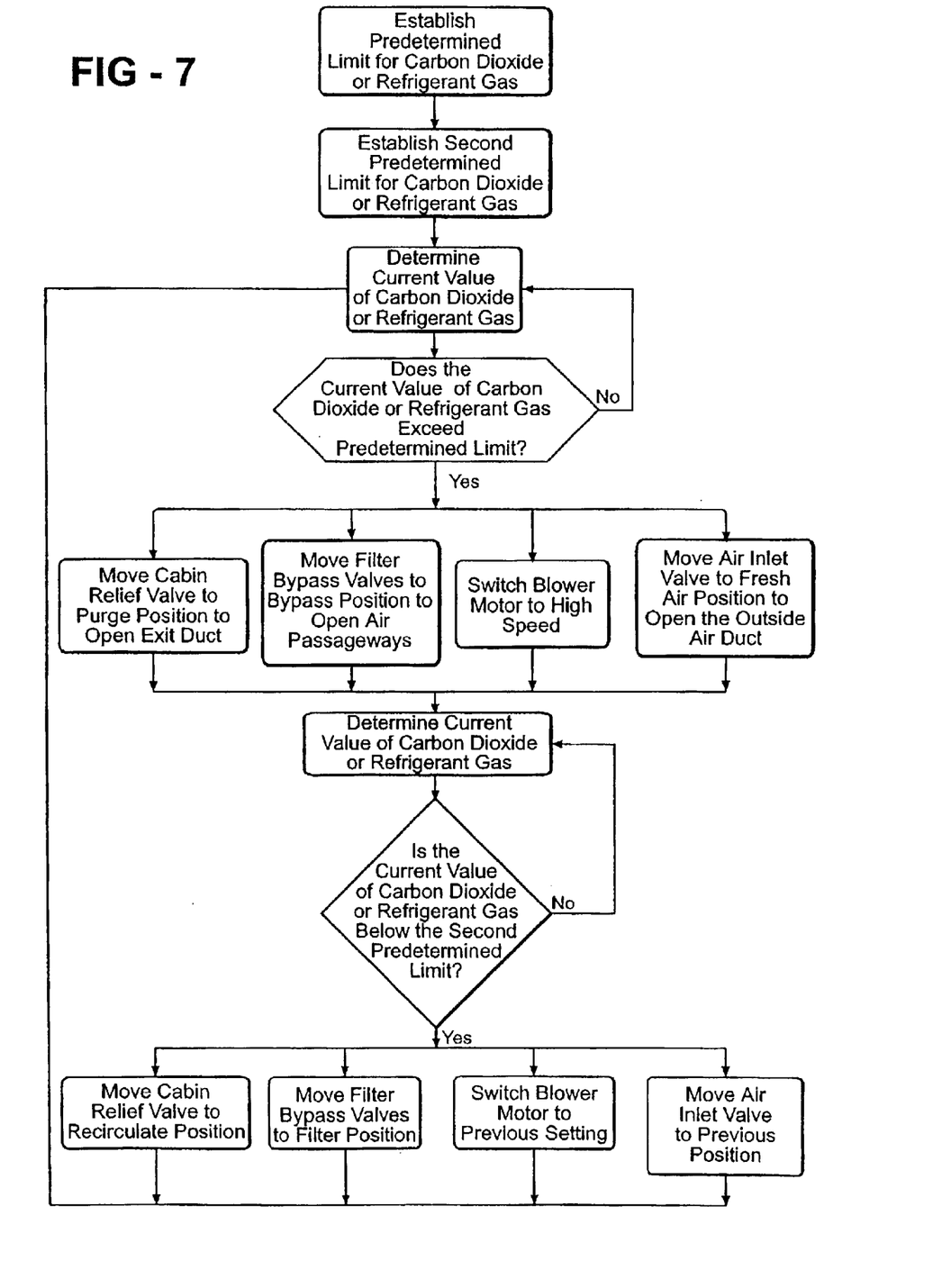
FIG. 7 is a flowchart illustrating steps carried out by the air quality system of the present invention.
Figure 8:
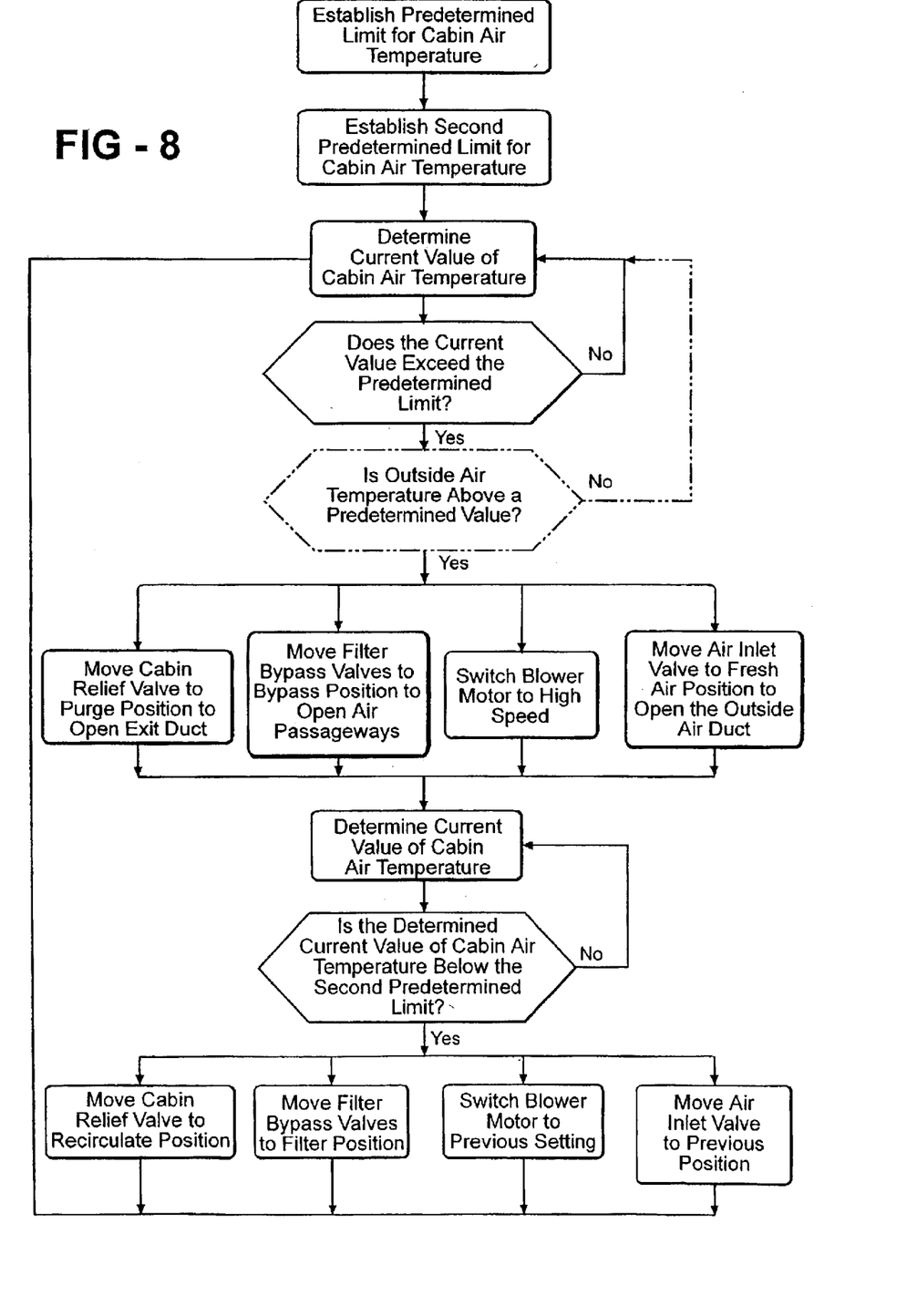
FIG. 8 is a flowchart illustrating steps carried out by the air quality system of the present invention.

Operation of the air quality system 14 will now be described with reference to FIGS. 5–8. FIG. 5 illustrates the preferred operation of the present invention wherein the three air quality parameters are monitored. FIGS. 6–8 illustrate alternative embodiments in which only one of the air quality parameters are monitored. The steps carried out to maintain the air quality in the cabin 10 of the vehicle 12 are substantially similar for all embodiments.

To start, the predetermined limits for the air quality parameters must be established and programmed into the controller 32. Once the predetermined limits are set in the controller 32, the controller 32 determines the current values of the air quality parameters by continuously monitoring signals sent from the air quality sensors 26,28,30. As previously set forth, the air quality parameters include cabin air temperature, particulates, and carbon dioxide or refrigerant gas. Hence, the current values of the air quality parameters correspond to current cabin air temperature, current levels of particulates in the air, and current carbon dioxide or refrigerant gas levels in the air.

The controller 32 then compares the determined current values of the air quality parameters to the predetermined limits. If the determined current value of any of the air quality parameters exceeds the respective predetermined limit, then the controller 32 moves from the non-purging mode to the purging mode. In the purging mode, the controller 32 replaces the air within the cabin 10 of the vehicle 12 with fresh air from the outside 40 of the cabin 10 thereby improving the air quality within the cabin 10 of the vehicle 12. Please note in FIGS. 5 and 8, an operational step shown by hidden lines. The operational step is determining whether the outside air temperature is above the predetermined value. The use of hidden lines illustrates that for the controller 32 to switch to the purging mode due to the cabin air temperature rising above the associated predetermined limit, the outside air temperature must first be above the predetermined value, as previously described. This operational step does not prevent the controller 32 from switching to the purging mode when the current value of any of the other air quality parameters, i.e., particulates and carbon dioxide or refrigerant gas, are above their respective predetermined limits. For these other air quality parameters, the controller 32 will switch to the purging mode when their current values exceed their respective predetermined limits regardless of the outside air temperature.

In the purging mode, the controller 32 moves the cabin relief valve 54 from the recirculate position 58 to the purge position 56 to allow the air within the cabin 10 to move to the outside 40 of the cabin 10. Simultaneously, the controller 32 moves the air inlet valve 38 from the recirculate air position 42 to the fresh air position 44 to provide fresh air from the outside 40 of the cabin 10 into the cabin 10. The combination of moving the cabin relief valve 54 to the purge position 56 and moving the air inlet valve 38 to the fresh air position 44 creates a high airflow rate through the cabin 10 to expedite replacement of air having poor air quality with the fresh air.

In the purging mode, the controller 32 also moves the filter bypass valves 120,132 to the bypass positions 124,136 to expedite the movement of fresh air into the cabin 10 by bypassing the plurality of air filters 100,102,104 within the HVAC unit 18. The controller 32 also switches a blower speed of the blower motor 74 from the low speed to the high speed in response to the current value of any of the air quality parameters exceeding the respective predetermined limit.

While in the purging mode, the controller 32 continues to monitor the air quality of the cabin 10 of the vehicle 12. In particular, the controller 32 continues to determine current values of each of the air quality parameters while the air in the cabin 10 is being replaced with the fresh air. This is to ensure that the air of the cabin 10 reaches an acceptable air quality level before the controller 32 is switched back to the non-purging mode. The acceptable air quality level is represented by a second predetermined limit determined for each of the air quality parameters. In other words, the second predetermined limits represent acceptable levels of the air quality parameters. The second predetermined limits for the air quality parameters are established and programmed into the controller 32 prior to operation.

While operating in the purging mode, the controller 32 compares the determined current values of each of the air quality parameters with the respective second predetermined limits. The second predetermined limit for cabin air temperature may be a current value of the outside air temperature or the temperature set by the passenger of the vehicle 12. The second predetermined limit for particulates in the cabin 10 may be 0.1 mg/m3, and the second predetermined limit for carbon dioxide or refrigerant gas for the cabin 10 may be 1,000 ppm. When the air from the cabin 10 has been sufficiently purged, i.e., replaced with the fresh air, the current values of the air quality parameters will fall to the acceptable second predetermined limits.

In response to each of the current values falling below the respective second predetermined limits, the controller 32 switches back to the non-purging mode and discontinues replacing the air of the cabin 10 with the fresh air from the outside 40 of the cabin 10. Hence, when the cabin air temperature equals the outside air temperature or the cabin air temperature equals the temperature set by the passenger of the vehicle 12 and the particulates in the cabin 10 are below 0.1 mg/m3 and the carbon dioxide or refrigerant gas for the cabin 10 is below 1,000 ppm, then the controller 32 switches back to the non-purging mode. In other words, the air quality within the cabin 10 has been sufficiently improved to discontinue purging.

When the controller 32 switches from the purging mode to the non-purging mode, the cabin relief valve 54 moves from the purge position 56 to the recirculate position 58, the filter bypass valves 120,132 move from the bypass positions 124,136 to the filter positions 122,134, the blower motor 74 is switched back to a previous speed setting, and the air inlet valve 38 moves back to a previous position. Hence, when the controller 32 switches from the purging mode to the non-purging mode after all of the air quality parameters have fallen below the respective second predetermined limits, the air quality system 14 resumes operation as if the controller 32 had never been switched to the purging mode. The air quality system 14 then continues to monitor the air quality for the next poor air quality scenario.

Obviously, many modifications and variations of the present invention are possible in light of the above teachings. The invention may be practiced otherwise than as specifically described within the scope of the appended claims.

What is claimed is:

1. An air quality system for controlling air quality within a cabin of a vehicle, said system comprising:
   an air quality sensor for detecting an air quality parameter;
   a controller responsive to said air quality sensor for determining a current value of the air quality parameter and determining whether the current value exceeds a predetermined limit whereby the predetermined limit represents poor air quality within the cabin, said controller being operable between purging and non-purging modes for purging the air from the cabin in said purging mode when the current value of the measured air quality parameter exceeds the predetermined limit;
   an air inlet valve responsive to said controller and movable between recirculate air and fresh air positions such that fresh air from outside of the cabin moves through said air inlet valve into the cabin in said fresh air position and said air inlet valve moves to said fresh air position when said controller is in said purging mode to improve the air quality within the cabin of the vehicle; and
   a cabin relief valve responsive to said controller and movable between purge and recirculate positions such that the air within the cabin is discharged from the cabin to the outside of the cabin in said purge position and said cabin relief valve moves to said purge position when said controller is in said purging mode to improve the air quality within the cabin of the vehicle.

2. A system as set forth in claim 1 further including a blower operatively responsive to said controller for moving air through said air inlet valve wherein said blower includes a blower motor operable between low and high speeds and said blower motor operates at said high speed when said controller is in said purging mode for quickly purging the air from the cabin.

3. A system as set forth in claim 2 further including a housing supporting said blower wherein said air inlet valve engages said housing and said housing defines a blower compartment and a heat exchange compartment and said blower is positioned in said blower compartment.

4. A system as set forth in claim 3 wherein said air quality sensor is disposed within said housing.

5. A system as set forth in claim 3 wherein said housing defines an outside air duct and said air inlet valve opens said outside air duct when said controller is in said purging mode thereby allowing the fresh air from outside of the cabin to move through said outside air duct and said air inlet valve into said housing.

6. A system as set forth in claim 5 further including an outside air particulate filter positioned in said outside air duct for removing particulates from the air outside of the cabin of the vehicle.

7. A system as set forth in claim 5 further including an air inlet valve actuator responsive to said controller and operatively engaging said air inlet valve for moving said air inlet valve between said recirculate air and said fresh air positions.

8. A system as set forth in claim 7 further including a plurality of air filters disposed in said housing wherein said plurality of air filters and said housing define a pair of air passageways therebetween, said pair of air passageways being capable of providing operative communication between said outside air duct and said blower compartment.

9. A system as set forth in claim 8 further including a pressure sensor proximate said housing and in operative communication with said controller for measuring a pressure differential across said plurality of air filters.

10. A system as set forth in claim 8 wherein one of said plurality of filters is a carbon monoxide filter for removing carbon monoxide from the air and one of said plurality of filters is an activated carbon filter for removing odor from the air.

11. A system as set forth in claim 10 further including an electrically enhanced filter proximate to said outside air duct.

12. A system as set forth in claim 11 wherein each of said plurality of filters include a tray slidably engaging said housing such that said trays slide into said housing when in an operating position.

13. A system as set forth in claim 8 further including a first filter bypass valve engaging said housing and movable between filter and bypass positions for selectively moving air through said plurality of air filters in said filter position and through one of said pair of air passageways in said bypass position thereby bypassing said plurality of filters in said bypass position.

14. A system as set forth in claim 13 further including a second filter bypass valve engaging said housing and movable between filter and bypass positions for selectively moving air through said plurality of air filters in said filter position and through one of said pair of air passageways in said bypass position thereby bypassing said plurality of filters in said bypass position.

15. A system as set forth in claim 14 further including a first filter bypass valve actuator responsive to said controller and operatively engaging said first filter bypass valve for moving said first filter bypass valve between said filter and bypass positions.

16. A system as set forth in claim 15 further including a second filter bypass valve actuator responsive to said controller and operatively engaging said second filter bypass valve for moving said second filter bypass valve between said filter and bypass positions.

17. A system as set forth in claim 5 further including a cabin relief valve actuator responsive to said controller and operatively engaging said cabin relief valve for moving said cabin relief valve between said purge and recirculate positions.

18. A system as set forth in claim 17 further including an evaporator and a heater core disposed in said heat exchange compartment of said housing for cooling and heating air within said housing wherein said evaporator is downstream of said blower and said heater core is downstream of said evaporator.

19. A system as set forth in claim 18 wherein said housing defines a plurality of outlet ducts for directing the air from within said housing into the cabin wherein said plurality of outlet ducts include at least a defrost duct, a heater duct, and a vent duct.

20. A system as set forth in claim 1 further including an outside air temperature sensor in operative communication with said controller for measuring a temperature of the air outside of the cabin.

21. A system as set forth in claim 1 further including an outside air quality sensor in operative communication with said controller for measuring carbon monoxide, nitrogen oxides, sulfer dioxide, hydrogen sulfide, and un-burnt hydrocarbons in the air outside of the cabin.

22. A system as set forth in claim 1 wherein said air quality sensor is further defined as a refrigerant gas sensor in operative communication with said controller for determining a current value of refrigerant gas and determining whether the current value exceeds a predetermined limit for refrigerant gas whereby the predetermined limit represents poor air quality for the cabin and said controller switches to said purging mode when the current value of refrigerant gas exceeds the predetermined limit.

23. A system as set forth in claim 1 wherein said air quality sensor is further defined as a particulate sensor in operative communication with said controller for determining a current value of particulates in the cabin and determining whether the current value exceeds a predetermined limit for particulates whereby the predetermined limit represents poor air quality within the cabin and said controller switches to said purging mode when the current value of particulates exceeds the predetermined limit.

24. A system as set forth in claim 1 wherein said air quality sensor is further defined as a carbon dioxide sensor in operative communication with said controller for determining a current value of carbon dioxide and determining whether the current value exceeds a predetermined limit for carbon dioxide whereby the predetermined limit represents poor air quality for the cabin and said controller switches to said purging mode when the current value of carbon dioxide exceeds the predetermined limit.

25. A system as set forth in claim 1 wherein said air quality sensor is further defined as a cabin air temperature sensor in operative communication with said controller for determining a current value of cabin air temperature for the cabin and determining whether the current value exceeds a predetermined limit for cabin air temperature whereby the predetermined limit represents poor air quality for the cabin and said controller switches to said purging mode when the current value of the cabin air temperature exceeds the predetermined limit to improve the air quality.

26. A vehicle having an air quality system for controlling air quality, comprising:
a vehicle body defining a cabin;
an air quality sensor proximate said vehicle body for detecting an air quality parameter;
a controller proximate said vehicle body and responsive to said air quality sensor for determining a current value of the air quality parameter and determining whether the current value exceeds a predetermined limit whereby the predetermined limit indicates poor air quality for said cabin, said controller being operable between purging and non-purging modes for purging the air from said cabin in said purging mode when the current value of the measured parameter exceeds the predetermined limit;
an HVAC unit proximate said vehicle body having an air inlet valve responsive to said controller and movable between recirculate air and fresh air positions such that fresh air from outside of the cabin moves through said air inlet valve and said HVAC unit into said cabin in said fresh air position and said air inlet valve moves to said fresh air position when said controller is in said purging mode to improve the air quality within said cabin; and
a cabin relief valve proximate said vehicle body, responsive to said controller, and movable between purge and recirculate positions such that the air within said cabin is discharged from said cabin to the outside of said vehicle body when said cabin relief valve is in said purge position and said cabin relief valve moves to said purge position when said controller is in said purging mode to improve the air quality within said cabin of the vehicle.

27. A vehicle as set forth in claim 26 wherein said HVAC unit includes a blower operatively responsive to said controller for moving air through said air inlet valve wherein said blower includes a blower motor operable between low and high speeds and said blower motor operates at said high speed when said controller is in said purging mode for quickly purging the air from said cabin.

28. A vehicle as set forth in claim 27 wherein said HVAC unit includes a housing supporting said blower wherein said air inlet valve engages said housing.

29. A vehicle as set forth in claim 28 wherein said housing defines an outside air duct and said air inlet valve opens said outside air duct when said controller is in said purging mode thereby allowing the fresh air from outside of the cabin to move through said outside air duct and said air inlet valve into said housing.

30. A vehicle as set forth in claim 29 further including an air inlet valve actuator responsive to said controller and operatively engaging said air inlet valve for moving said air inlet valve between said recirculate air and said fresh air positions.

31. A vehicle as set forth in claim 30 further including a plurality of air filters disposed in said housing wherein said plurality of air filters and said housing define a pair of air passageways therebetween, said pair of air passageways being capable of providing operative communication between said outside air duct and said blower compartment.

32. A vehicle as set forth in claim 31 further including a first filter bypass valve engaging said housing and movable between filter and bypass positions for selectively moving air through said plurality of air filters in said filter position and through one of said pair of air passageways in said bypass position thereby bypassing said plurality of filters in said bypass position.

33. A vehicle as set forth in claim 32 further including a second filter bypass valve engaging said housing and movable between filter and bypass positions for selectively moving air through said plurality of air filters in said filter position and through one of said pair of air passageways in said bypass position thereby bypassing said plurality of filters in said bypass position.

34. A vehicle as set forth in claim 33 further including a first filter bypass valve actuator responsive to said controller and operatively engaging said first filter bypass valve for moving said first filter bypass valve between said filter and bypass positions.

35. A vehicle as set forth in claim 34 further including a second filter bypass valve actuator responsive to said controller and operatively engaging said second filter bypass valve for moving said second filter bypass valve between said filter and bypass positions.

36. A vehicle as set forth in claim 35 further including a cabin relief valve actuator responsive to said controller and operatively engaging said cabin relief valve for moving said cabin relief valve between said purge and recirculate positions.

37. A vehicle as set forth in claim 26 further including a second air quality sensor for detecting a second air quality parameter, said controller being responsive to said second air quality sensor such that said controller switches to said purging mode when a current value of the second air quality parameter exceeds a predetermined limit for the second air quality parameter.

38. A vehicle as set forth in claim 37 further including a third air quality sensor for detecting a third air quality parameter, said controller being responsive to said third air quality sensor such that said controller switches to said purging mode when a current value of the third air quality parameter exceeds a predetermined limit for the third air quality parameter.

39. A vehicle as set forth in claim 36 wherein said vehicle body defines a trunk space partitioned from said cabin and said vehicle body includes a rear ledge in a rear of said vehicle body and a partition wall extending from said rear ledge, both said rear ledge and said partition wall separating said trunk space from said cabin.

40. A vehicle as set forth in claim 39 wherein said cabin relief valve is positioned in said rear ledge such that when said cabin relief valve is in said purge position the air from within said cabin exits through said rear ledge into said trunk space.

41. A vehicle as set forth in claim 39 wherein said cabin relief valve is positioned in said partition wall such that when said cabin relief valve is in said purge position the air from within said cabin exits through said partition wall into said trunk space.

42. A vehicle as set forth in claim 38 wherein one of said air quality sensors is disposed within said housing.

43. A vehicle as set forth in claim 42 wherein one of said air quality sensors is disposed within said cabin.

44. A method of controlling air quality within a cabin of a vehicle, comprising the steps of:
   establishing a predetermined limit for an air quality parameter;
   determining a current value of the air quality parameter;
   comparing the determined current value of the air quality parameter to the predetermined limit for the air quality parameter;
   automatically moving a cabin relief valve from a recirculate position to a purge position to allow the air within the cabin to move to the outside of the cabin in response to the determined current value of the air quality parameter exceeding the predetermined limit for the air quality parameter; and
   automatically moving an air inlet valve from a recirculate air position to a fresh air position to provide fresh air from the outside of the cabin into the cabin to expedite movement of the air within the cabin to the outside of the cabin in response to the determined current value of the air quality parameter exceeding the predetermined limit for the air quality parameter.

45. A method as set forth in claim 44 further including the step of switching a blower speed of a blower motor from a low speed to a high speed in response to the determined current value exceeding the predetermined limit.

46. A method as set forth in claim 45 further including the step of measuring a pressure differential across a plurality of air filters in an HVAC unit and moving a pair of filter bypass valves of the HVAC unit in response to the measured pressure differential exceeding a predetermined pressure differential.

47. A method as set forth in claim 45 wherein said step of replacing the air further includes the step of moving a pair of filter bypass valves of an HVAC unit to bypass positions to expedite the movement of fresh air into the cabin by bypassing a plurality of air filters within the HVAC unit in response to the determined current value of the air quality parameter exceeding the predetermined limit for the air quality parameter.

48. A method as set forth in claim 47 further including the step of determining the current value of the air quality parameter while replacing the air.

49. A method as set forth in claim 48 further including the step of comparing the determined current value while replacing the air with a second predetermined limit.

50. A method as set forth in claim 49 further including the step of discontinuing replacing the air of the cabin in response to the determined current value that is determined while replacing the air falling below the second predetermined limit.

51. A method as set forth in claim 44 wherein the step of determining a current value of an air quality parameter is further defined as determining a current amount of particulates in the air.

52. A method as set forth in claim 44 wherein the step of determining a current value of an air quality parameter is further defined as determining a current amount of carbon dioxide or refrigerant gas in the air.

53. A method as set forth in claim 44 wherein the step of determining a current value of an air quality parameter is further defined as determining a current temperature of the air inside the cabin.

54. A method as set forth in claim 44 further including the step of establishing a predetermined limit for a second air quality parameter.

55. A method as set forth in claim 54 further including the step of determining a current value of the second air quality parameter.

56. A method as set forth in claim 55 further including the step of comparing the determined current value of the second air quality parameter to the predetermined limit for the second air quality parameter.

57. A method as set forth in claim 56 further including the step of replacing the air from within the cabin of the vehicle with fresh air from outside the cabin of the vehicle in response to the determined current value of the second air quality parameter exceeding the predetermined limit for the second air quality parameter thereby improving the air quality within the cabin of the vehicle.

58. A method as set forth in claim 57 further including the step of establishing a predetermined limit for a third air quality parameter.

59. A method as set forth in claim 58 further including the step of determining a current value of the third air quality parameter.

60. A method as set forth in claim 59 further including the step of comparing the determined current value of the third air quality parameter to the predetermined limit for the third air quality parameter.

61. A method as set forth in claim 60 further including the step of replacing the air from within the cabin of the vehicle with fresh air from outside the cabin of the vehicle in response to the determined current value of the third air quality parameter exceeding the predetermined limit for the third air quality parameter thereby improving the air quality within the cabin of the vehicle.

* * * * *